(12) United States Patent
Fattouche

(10) Patent No.: US 10,787,839 B2
(45) Date of Patent: Sep. 29, 2020

(54) SNAP-ON COVER FOR VEHICLE DOOR HANDLE

(71) Applicant: Najee Fattouche, Bowie, MD (US)

(72) Inventor: Najee Fattouche, Bowie, MD (US)

(73) Assignee: Neo Design, LLC, Bowie, MD (US)

( * ) Notice: Subject to any disclaimer, the term of this patent is extended or adjusted under 35 U.S.C. 154(b) by 0 days.

(21) Appl. No.: 16/602,320

(22) Filed: Sep. 16, 2019

(65) Prior Publication Data

US 2020/0010027 A1    Jan. 9, 2020

Related U.S. Application Data

(63) Continuation-in-part of application No. 16/030,775, filed on Jul. 9, 2018, now abandoned.

(51) Int. Cl.
  *E05B 1/00*     (2006.01)
  *E05B 85/10*    (2014.01)
  *B60R 13/04*    (2006.01)

(52) U.S. Cl.
  CPC ............ *E05B 1/0061* (2013.01); *E05B 85/10* (2013.01); *B60R 13/04* (2013.01)

(58) Field of Classification Search
  CPC ........ E05B 85/10; E05B 1/0061; B60R 13/04
  See application file for complete search history.

(56) References Cited

U.S. PATENT DOCUMENTS

| | | | | |
|---|---|---|---|---|
| 3,388,523 A * | 6/1968 | Evans | ..................... | B60R 13/04 52/716.5 |
| 3,811,989 A * | 5/1974 | Hearn | ..................... | B60R 13/04 428/122 |
| 4,087,141 A * | 5/1978 | Roberts | .................. | A47B 95/02 16/412 |
| 4,605,124 A * | 8/1986 | Sandel | .................. | F21V 21/403 16/421 |
| 5,659,927 A * | 8/1997 | Shanok | .................. | A47B 95/02 16/412 |
| 6,241,247 B1 * | 6/2001 | Sternberg | ................ | A63F 13/06 273/148 B |
| 6,322,115 B1 * | 11/2001 | Devilliers | ............... | B60R 19/18 293/120 |
| 6,412,145 B1 * | 7/2002 | Rubel | ..................... | B60R 13/00 16/110.1 |

(Continued)

OTHER PUBLICATIONS

SES Trims, Apr. 2014, https://web.archive.org/web/20140405012208/https://www.carid.com/ses-trims/door-handle-covers.html (Year: 2014).*

*Primary Examiner* — Jeffrey O'Brien

(74) *Attorney, Agent, or Firm* — Chauncey B. Johnson, Esq.; Law Office of Chauncey B. Johnson

(57) ABSTRACT

A door handle cover adapted for engagement to a door handle on a vehicle, comprising an elongate panel having an upper lip along an upper longitudinal edge thereof and a lower lip along a lower longitudinal edge thereof, the upper lip comprising a generally hook-shaped member that defines an interior region adapted to grippingly engage an upper portion of the door handle, the lower lip comprising a generally hook-shaped member that defines an interior region adapted to grippingly engage a lower portion of the door handle, wherein upon engagement of the upper lip and lower lip on the on the door handle the cover is thereby firmly affixed to the door handle.

27 Claims, 11 Drawing Sheets

(56) References Cited

U.S. PATENT DOCUMENTS

| | | | | |
|---|---|---|---|---|
| 6,740,834 B2* | 5/2004 | Sueyoshi | B60R 25/246 | 200/293.1 |
| 6,883,847 B2* | 4/2005 | Willett | B60J 10/265 | 296/1.08 |
| 7,090,278 B2* | 8/2006 | Hwang | B60N 3/026 | 16/444 |
| 7,213,853 B2* | 5/2007 | Elwell | B60R 13/00 | 296/1.08 |
| 7,384,091 B2* | 6/2008 | Fukuda | E05B 79/06 | 296/1.02 |
| 7,597,371 B2* | 10/2009 | Gidcumb, Jr. | B60R 13/0206 | 296/1.08 |
| 7,806,450 B2* | 10/2010 | Johnson | B60R 13/0243 | 296/1.08 |
| 8,042,845 B2* | 10/2011 | Tanimoto | E05B 81/78 | 292/336.3 |
| 8,328,259 B2* | 12/2012 | Matsuzaki | B60N 2/5841 | 296/1.08 |
| 8,851,536 B2* | 10/2014 | Savant | B60R 13/005 | 292/336.3 |
| 9,194,156 B2* | 11/2015 | Simon | E05B 1/0069 | |
| 9,279,272 B2* | 3/2016 | Noda | E05B 85/16 | |
| 9,447,604 B2* | 9/2016 | Witte | E05B 7/00 | |
| 2002/0092132 A1* | 7/2002 | Kessler | B62B 5/06 | 16/436 |
| 2010/0287843 A1* | 11/2010 | Oh | E05B 1/0015 | 49/460 |
| 2013/0125345 A1* | 5/2013 | Specht | E05B 1/0015 | 16/413 |
| 2014/0203583 A1* | 7/2014 | Yoshimoto | B60J 10/75 | 296/1.08 |
| 2014/0346798 A1* | 11/2014 | Chou | B60R 13/0206 | 296/1.08 |
| 2015/0298632 A1* | 10/2015 | Chiba | B60R 19/24 | 296/1.08 |
| 2016/0032616 A1* | 2/2016 | Simon | E05B 1/0069 | 29/453 |
| 2016/0046313 A1* | 2/2016 | Landwehr | B62B 5/069 | 280/33.992 |
| 2018/0230717 A1* | 8/2018 | Beck | E05B 1/0015 | |
| 2019/0016278 A1* | 1/2019 | Kozuma | E05B 85/10 | |

* cited by examiner

SNAP-ON COVER FOR VEHICLE DOOR HANDLE

This continuation in part application benefits and claims priority from a previously filed application U.S. patent application Ser. No. 16/030,775, now abandoned.

TECHNICAL FIELD

The presently disclosed subject matter relates to door handle covers and, more particularly, to door handle covers for automobile door handles.

BACKGROUND

After-market trim components for automobiles are components which can be added to an automobile to add decoration and customization to a vehicle beyond what is supplied by the vehicle manufacturer. One such trim component is a door handle cover which fits over the manufacturer's installed exterior door handle and provides a customized look. An after-market door handle cover is typically custom manufactured to precisely fit over a specific one or more door handles of a specific vehicle or vehicles. Commonly, after-market vehicle door handle covers are finished in a chrome or black finish, thus providing a new look to the automobile installed thereon.

The automobile door handle covers which are known in the art are typically fastened to the door handle and held in place using a bonding material such as double-sided tape or glue.

Thus the prior art door handle covers require the application of secondary components for affixing to the door handle (i.e. tape, glue, clips, etc.). This makes installation somewhat tedious, inconvenient and perhaps even messy. Furthermore, these door handle covers are prone to loosen over time with repeated use of the door handle.

GENERAL DESCRIPTION

One objective of the present invention is to provide an improved door handle cover capable of being snapped-on to the door handle, without requiring the use of double-sided tape or other bonding materials, or clips, to hold the door handle cover in place.

Another objective of the present invention is to provide a door handle cover constructed of rigid material capable of being flexed and optionally constructed of a single piece of polymer material capable of affixing to a door handle cover without any additional components.

One or more of these or other objects of the invention will be apparent from the specification and claims that follow.

Therefore, in accordance with certain aspects of the presently disclosed subject matter, there is provided a door handle cover adapted for engagement to a door handle on a vehicle, said cover comprising an elongate panel having an upper lip along an upper longitudinal edge thereof and a lower lip along a lower longitudinal edge thereof, said upper lip comprising a generally hook-shaped member that defines an interior region adapted to grippingly engage an upper portion of said door handle, said lower lip comprising a generally hook-shaped member that defines an interior region adapted to grippingly engage a lower portion of said door handle, wherein upon engagement of the upper lip and lower lip on said door handle the cover is thereby firmly affixed to said door handle. In addition, the door handle cover of the present invention can be designed with or without an opening. When designed with an opening, said opening can accommodate a means for engaging and for locking and unlocking a prefabricated vehicle door lock.

In accordance with further aspects and, optionally, in combination with other aspects of the presently disclosed subject matter, there is provided a door handle cover adapted for engagement to a door handle on a vehicle, said cover comprising a major elongate panel and a minor elongate panel. The latter can be designed with or without an opening. When designed with an opening, said opening can accommodate a means for engaging and for locking and unlocking a prefabricated vehicle door lock.

In accordance with further aspects and, optionally, in combination with other aspects of the presently disclosed subject matter, a rear surface of said elongate panel is contoured to precisely conform to at least a portion of the visible surface of said door handle such that upon engagement of the upper lip and lower lip on said door handle, said elongate panel is intended to be flush against the door handle.

In accordance with further aspects and, optionally, in combination with other aspects of the presently disclosed subject matter, the elongate panel may be composed of a rigid polymer material that can be temporarily flexed during installation of said cover on said door handle.

In accordance with further aspects and, optionally, in combination with other aspects of the presently disclosed subject matter, the elongate panel is manufactured from a rigid material that allows for manipulation of the panel during installation on said door handle to facilitate engagement of the upper lip and lower lip to the upper portion and lower portion of the door handle respectively.

In accordance with further aspects and, optionally, in combination with other aspects of the presently disclosed subject matter, the front surface of the elongate panel is finished in a decorative finish.

In accordance with further aspects and, optionally, in combination with other aspects of the presently disclosed subject matter, the cover can be snapped on said door handle and held firmly in place by means of and said upper lip and lower lip engaging said door handle.

Among advantages of certain embodiments of the presently disclosed subject matter is that the cover can be snapped on to the door handle and held firmly in place on the door handle by means of the upper lip and lower lip, without requiring the use of double sided tape or clips to hold the cover in place.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1:
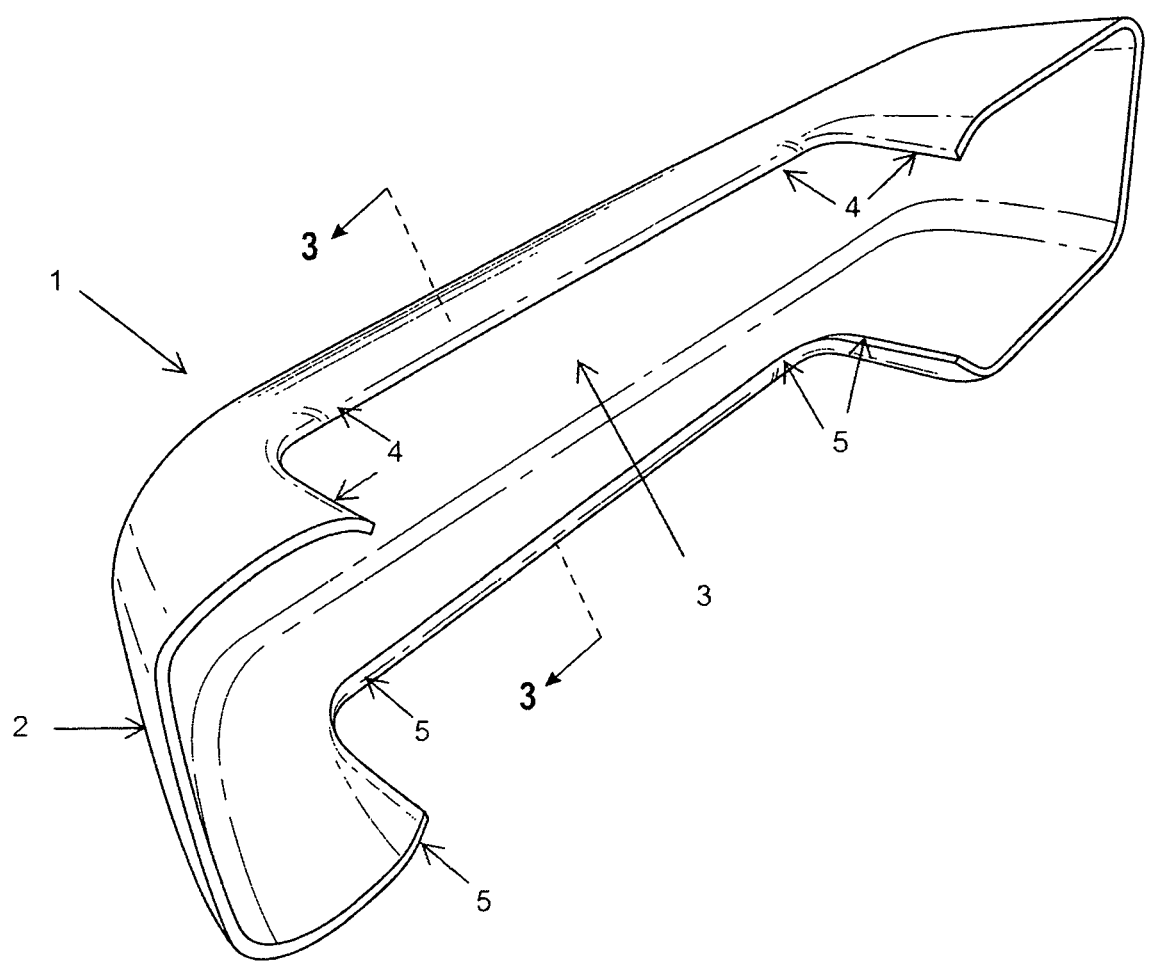
FIG. 1 illustrates an elevated perspective view of a vehicle door handle cover in accordance with a first embodiment of the presently disclosed subject matter.
Figure 2:
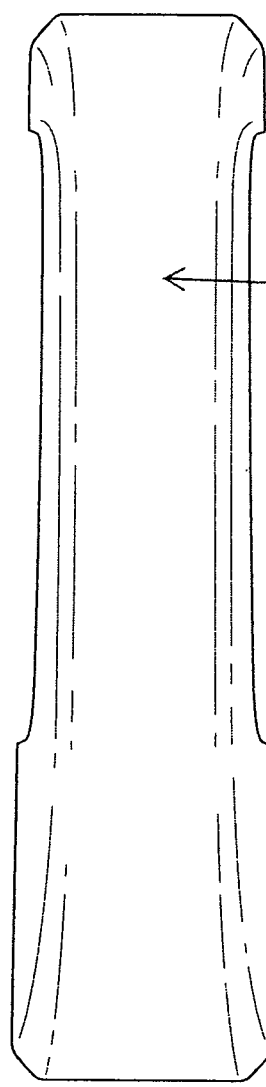
FIG. 2 illustrates a frontal view of the vehicle door handle cover in accordance with a first embodiment of the presently disclosed subject matter.
Figure 3:
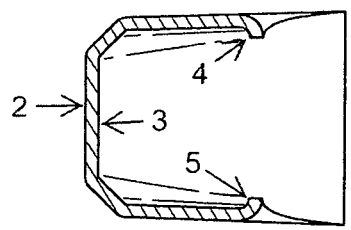
FIG. 3 illustrates a cross-sectional view of the vehicle door handle cover along an axis perpendicular to a longitudinal axis of the cover in accordance with a first embodiment of the presently disclosed subject matter.

Bearing this in mind, attention is drawn to FIG. 1, FIG. 2 and FIG. 3 illustrating a vehicle door handle cover in accordance with a first embodiment of the presently disclosed subject matter. As shown in FIG. 1, the cover comprises an elongate panel 1 having an upper lip 4 along its upper longitudinal edge, and a lower lip 5 comprise a generally hook-shaped member that defines an interior region adapted to grippingly engage a lower portion of the vehicle door handle. The cover is manufactured to conform to the shape of the specific door handle to which it is to be used for, such that upon engagement of the upper lip 4 and lower lip 5 on the door handle, the cover is thereby firmly affixed to the door handle.

Referring to the first embodiment of the present invention, and as illustrated in FIG. 2, a front surface 2 of the cover can be shaped or contoured to generally match a shape or contour of a door handle, in order to preserve the general appearance of a manufacturer supplied door handle, if it is desirable to do so. In addition, the front surface 2 of the cover can be finished in a [0038] decorative finish to provide a personalized or customized look. For example, the front surface 2 can be finished in chrome, or in a different color from that of the door handle itself, in some cases the front surface 2 can include other decorative elements.

Again, referring to the first embodiment of the present invention, and as illustrated in FIG. 3, a rear surface 3 of the elongate panel is shaped to precisely conform to a visible surface of a door handle such that upon engagement of the upper lip 4 and lower lip 5 on the door handle, a rear surface 3 of the elongate panel is flush against the door handle, thereby reducing or eliminating any movement of the cover on the door handle when a user grips and pulls the door handle to open a vehicle door. In some cases, the door handle may be curved or contoured. In such a case the rear surface 3 (including the interior surface of upper lip 4 and lower lip 5) can be similarly contoured to precisely conform to at least a portion of the visible surface of the door handle.

Preferably, the cover is made of a rigid polymer material that can be temporarily flexed by applying force or pressure to the cover. However, it is not necessary for the cover to be made of a polymer; any suitable rigid material capable of being flexed would work.

Still, referring to the first embodiment of the present invention, the cover is installed on a door handle by first manipulating the cover (e.g. by bending or flexing it) so that the distance between the upper and lower longitudinal edges of the cover is greater than the height or the door handle, allowing the edges to clear the door handle. Next, the cover is slid over the door handle and the pressure is relaxed. The relaxation will cause the cover to return to its natural rigid state, and grasp the door handle between the upper lip 4 and lower lip 5. Alternatively, the cover may also be installed by placing the cover over the door handle so that one of the lips (i.e., either the upper lip 4 on the lower lip 5) is aligned with a corresponding portion of the door handle, and subsequently manipulating the cover until an opposing lip engages with an opposing surface of the door handle.

Figure 4:
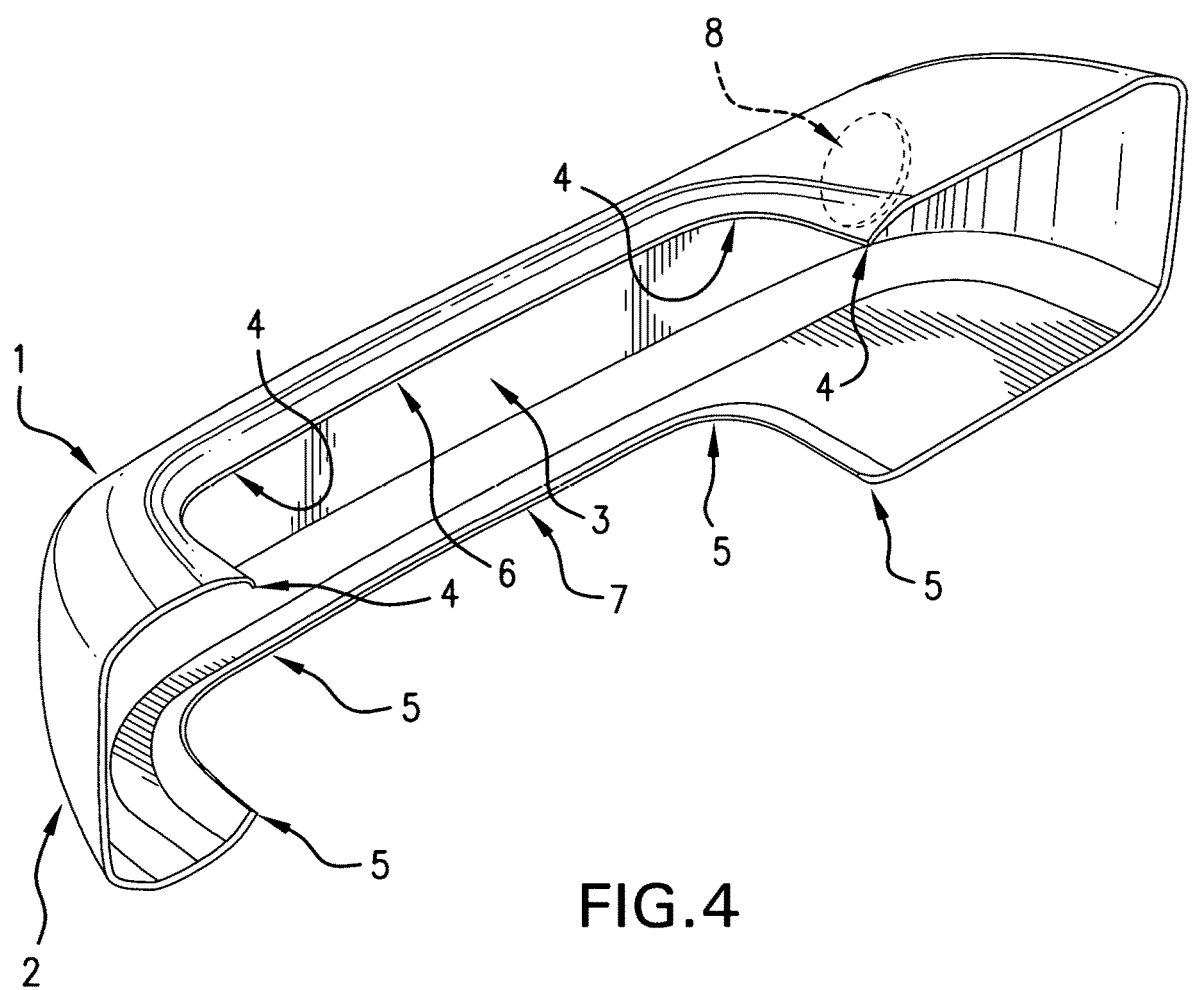
FIG. 4 illustrates an elevated perspective view of a vehicle door handle cover in accordance with a second embodiment of the presently disclosed subject matter.
Figure 5:
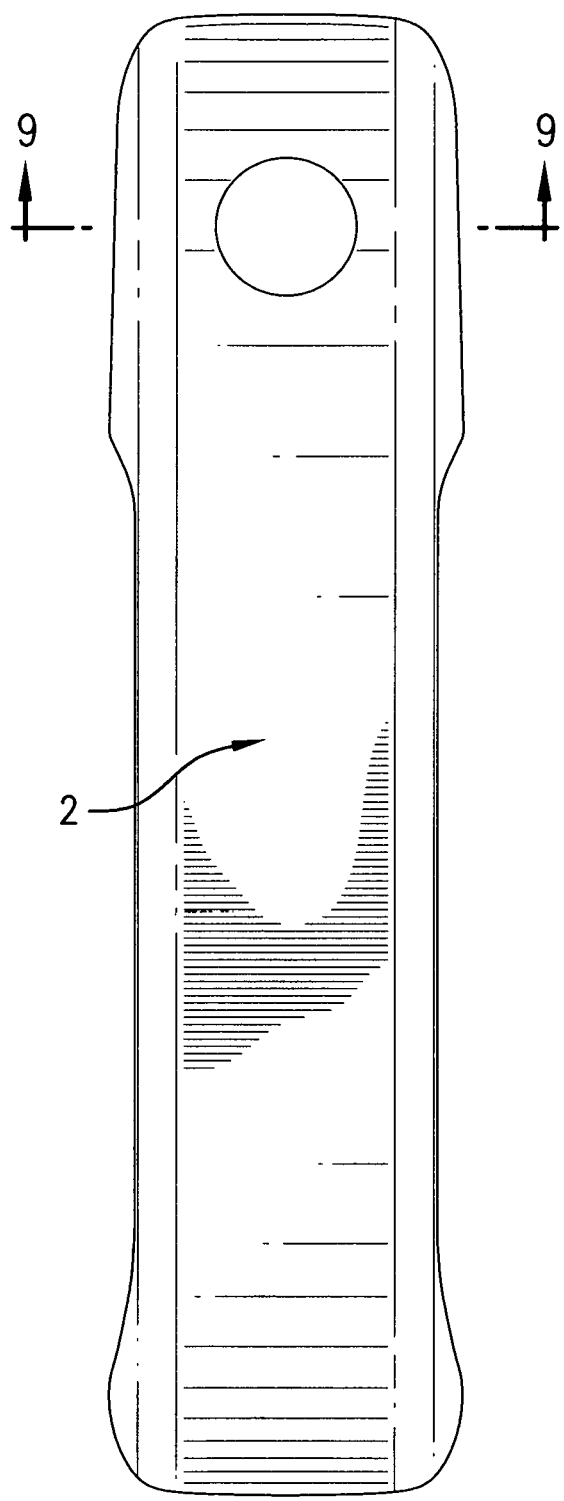
FIG. 5 illustrates a frontal view of the vehicle door handle cover in accordance with a second embodiment of the presently disclosed subject matter.

Referring to a second embodiment of the present invention, and as illustrated in FIGS. 4 and 5 is presented a vehicle door handle cover which comprises an elongate panel 1 having upper lip 4, along its upper longitudinal edge 6, and a lower lip 5 along its lower longitudinal edge 7. Each of the upper lip 4 and lower lip 5 is comprise of a generally hook-shaped member that defines an upper and lower interior region, respectively, and are adapted to grippingly engage the door handle. That is, the upper lip 4 defines an interior region adapted to grippingly engage an upper portion of the vehicle door handle, while the lower lip 5 defines an interior region adapted to grippingly engage a lower portion of the vehicle door handle. Still referring to illustrating FIGS. 4 and 5, there exist an opening 8 formed in the rear surface 3 of the elongate panel 1 of the vehicle door handle cover of this present embodiment. Said opening can be of any shape or form and is designed for accommodating a mechanical and/or an electrical and/or a pneumatic means for interacting with prefabricated locking means for locking and unlocking the door of a vehicle. Specifically, FIG. 5 illustrates a frontal view of the front surface 2 of this second embodiment comprising said opening 8 formed in the rear surface 3 of the elongate panel 1 of the vehicle door handle cover of this present embodiment.

As shown in FIG. 5, the front surface 2 of the cover can be shaped or contoured to generally match a shape or contour of a door handle, in order to preserve the general appearance of a manufacturer supplied door handle, if it is desirable to do so. In addition, the front surface 2 of the cover can be finished in a decorative finish to provide a personalized or customized look. As an example, the front surface 2 can be finished in chrome, or in a different color from that of the door handle itself. Also, the front surface 2 can be comprised of limitless decorative elements.

Still referring to the second embodiment of the present invention, and as illustrated in FIGS. 4 and 5, a rear surface 3 of the elongate panel is shaped to precisely conform to a visible surface of a door handle such that upon engagement of the upper lip 4 and lower lip 5 on the door handle, the rear surface 3 of the elongate panel is flush against the door handle, thereby reducing or eliminating any movement of the cover on the door handle when a user grips and pulls the door handle to open a vehicle door. Where the prefabricated door handle is curved or contoured, the rear surface 3 along with the interior surfaces of the upper lip 4 and the lower lip 5 can be similarly contoured to precisely conform to at least a portion of the visible surface of the door handle. Preferably, the cover of this second embodiment is made of a rigid polymer material that can be temporarily flexed by applying force or pressure to the cover. However, it is not necessary for the cover to be made of a polymer; any suitable rigid material capable of being flexed would work.

Still referring to the second embodiment of the present invention, and as illustrated in FIGS. 4 and 5, the cover is installed on a door handle by first manipulating the cover (e.g. bending or flexing it) so that the distance between the upper and lower longitudinal edges, 6 and 7 respectively, of the cover is greater than the height of the door handle, thereby allowing the edges to clear the door handle. Next, the cover is slid over the door handle and the pressure is relaxed. The relaxation will cause the cover to return to its natural rigid state, and grasp the door handle between the upper lip 4 and the lower lip 5. Alternatively, the cover may also be installed by placing the cover over the door handle so that one of the lips (i.e. either the upper lip 4 or the lower lip 5) is aligned with a corresponding portion of the door handle, and subsequently manipulating the cover until an opposing lip engages with an opposing surface of the door handle.

Further, referring to the second embodiment of the present invention, and as illustrated in FIGS. 4 and 5, it should be noted that the disclosed snap-on door handle cover can be manufactured according to precise predetermined specifications (i.e. for a specific door handle of a particular make and model of vehicle) that can ensure the cover will sit firmly and securely on the door handle for which it is made without requiring bonding material, such as glue or double sided tape. However, such bonding material may also be used, if desired, with the disclosed snap-on cover.

Referring to a third embodiment of the present invention, and as illustrated in FIG. 6, FIG. 7, FIG. 8 and FIG. 9, is presented a vehicle door handle cover of the present invention. Specifically referring to FIG. 6, a vehicle door handle cover of the present invention is comprise of a major elongate panel 1a and a minor elongate panel 1b, wherein the major elongate panel 1a has an upper lip 4a along its upper longitudinal edge 6a and a lower lip 5a along its lower longitudinal edge 7a. Each of the upper lip 4a and lower lip 5a is comprised of a generally hook-shaped member that defines an upper and lower interior region respectively. The major elongate panel 1a can be designed to grippingly engage a vehicle door handle. That is, the upper lip 4a defines an interior region adapted to grippingly engage a vehicle door handle, while the lower lip 5a defines an interior region adapted to grippingly engage a lower portion of a vehicle door handle. Still referring to FIG. 6 the minor elongate panel 1b is comprise of an upper lip 4b and lower lip 5b, wherein in said upper lip 4b and lower lip 5b are comprise of a generally hook-shaped member that defines an upper and lower interior region respectively, and are adapted to grippingly engage the door handle of a vehicle. That is, the upper lip 4b defines an interior region adapted to grippingly engage the door handle, while the lower lip 5b defines an interior region adapted to grippingly engage a lower portion of a vehicle door handle. Still referring to FIG. 6, the minor elongate panel may not comprise of an upper lip 4b and a lower lip 5b and may not comprise of a generally hook-shaped member that defines an upper and a lower interior region. In such a case the minor elongate panel 1b will fit firmly and securely on the door handle for which it is made, but requiring bonding material, such as glue or double sided tape, etc.

Figure 7:
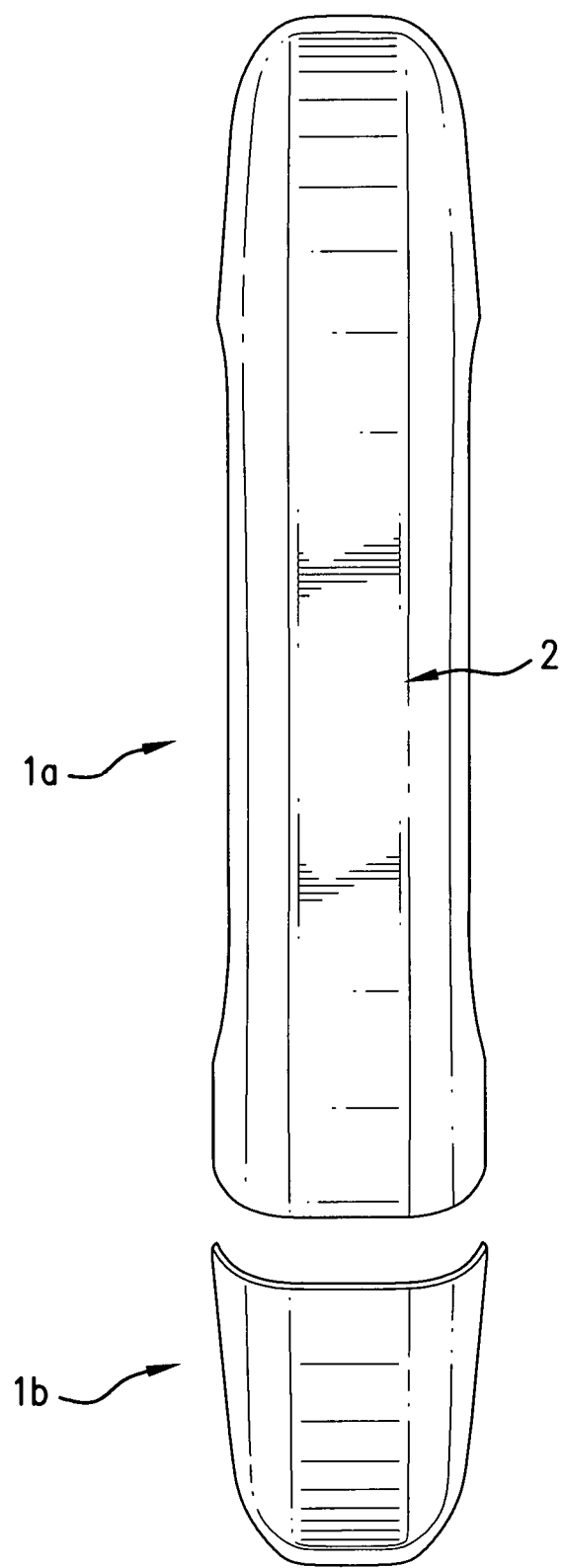
FIG. 7 illustrates a frontal view of the vehicle door handle cover in accordance with a third embodiment of the presently disclosed subject matter.
Figure 8:
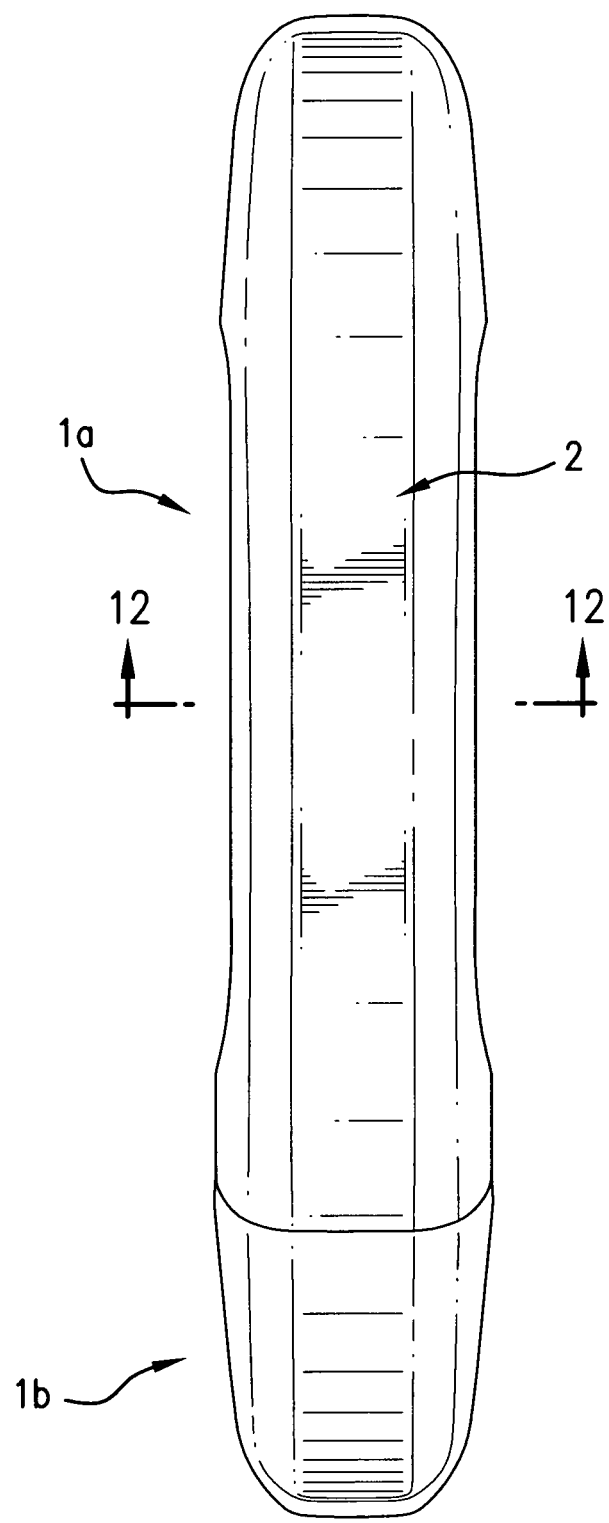
FIG. 8 illustrates a frontal view of the vehicle door handle cover in accordance with a third embodiment of the presently disclosed subject matter.

Again, referring to the third embodiment of the present invention, and as illustrated in FIG. 7 and FIG. 8, is presented frontal views of the door handle cover of the present invention, wherein, as illustrated in FIG. 7, the major elongate panel 1a and the minor elongate panel 1b can be designed with a corresponding predetermined spacing and/or separation in mind, so as to grippingly engage a vehicle door handle with the corresponding predetermined spacing and/or separation; or wherein, as illustrated in FIG. 8, the major elongate panel 1a and the minor elongate panel 1b can be designed with no corresponding predetermined spacing and/or separation in mind so as to grippingly engage a vehicle door handle with no corresponding predetermined spacing and/or separation. That is, when mounted to a vehicle door handle, as illustrated in FIG. 7, the vehicle door handle cover of the present invention appears as two separate units; and, as illustrated in FIG. 8, when mounted to a vehicle door handle, the vehicle door handle cover of the present invention appears as a single unit.

Yet again, referring to the third embodiment of the present invention, and as illustrated in FIG. 7 and FIG. 8, the front surfaces 2 of the door cover comprising of the major elongate panel 1a and the minor elongate panel 1b can be shaped or contoured to generally match a shape or contour of a door handle, in order to preserve the general appearance of a manufacturer supplied door handle, if it is desirable to do so. In addition, the front surfaces 2 of the door cover comprising of the major elongate panel 1a and the minor elongate panel 1b can be finished in a decorative finish to provide a personalized or customized look. As an example, the front surfaces 2 of the door cover comprising of the major elongate panel 1a and the minor elongate panel 1b can be finished in chrome, or in a different color from that of the door handle itself. Also, the front surfaces 2 of the door cover comprising of the major elongate panel 1a and the minor elongate panel 1b can comprise of limitless decorative elements.

Figure 6:
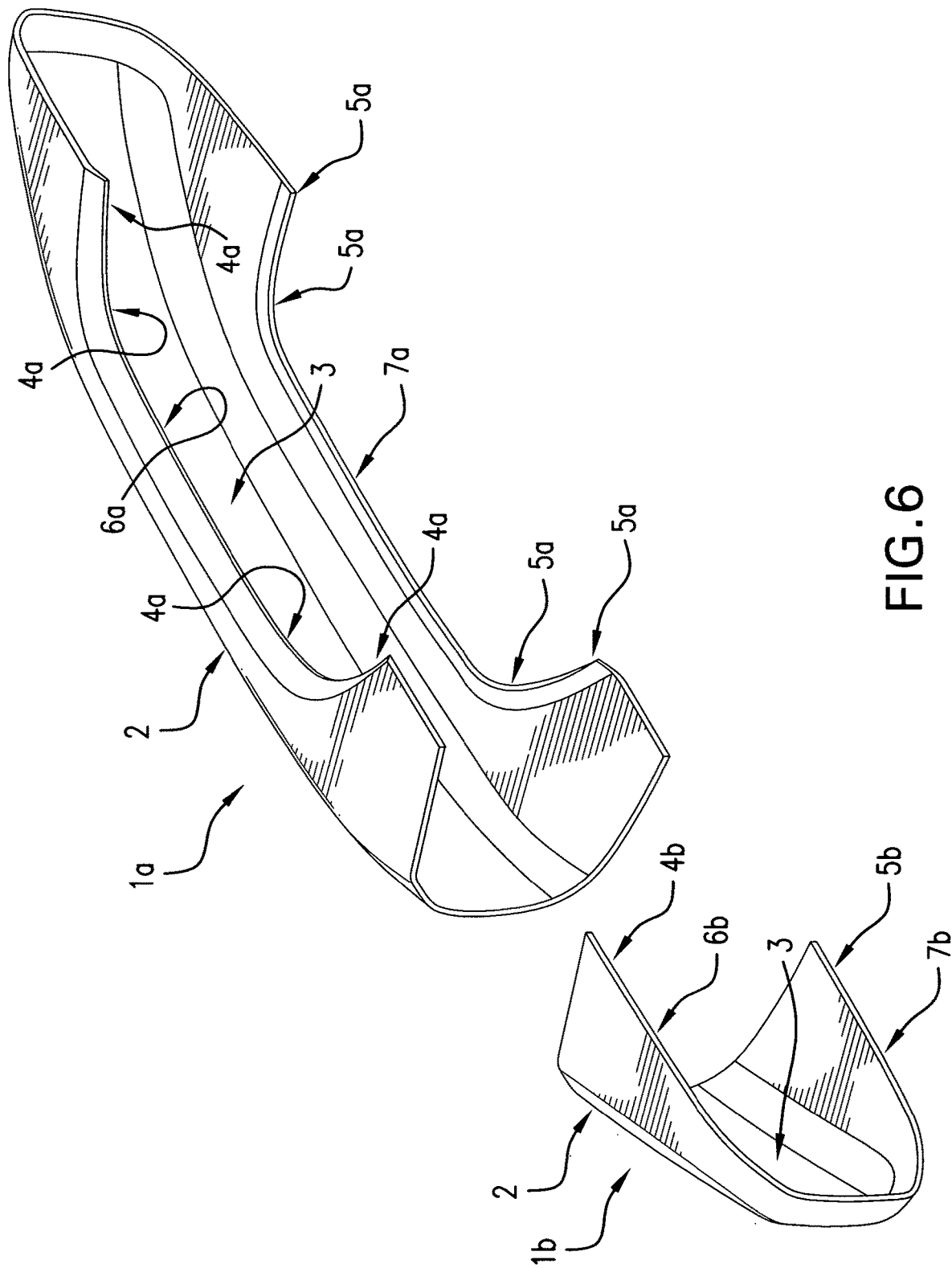
FIG. 6 illustrates an elevated perspective view of a vehicle door handle cover in accordance with a third embodiment of the presently disclosed subject matter.

Yet again, referring to the third embodiment of the present invention, and as illustrated in FIGS. 6, 7 and 8, rear surfaces 3 of the major elongate panel 1a and the minor elongate panel 1b are shaped to precisely conform to a visible surface of a door handle such that upon engagement of the upper lip 4a and lower lip 5b on the door handle as illustrated in FIG. 6, the rear surface 3 of the major elongate panel 1a is flush against the door handle, thereby reducing or eliminating any movement of the cover on the door handle when a user grips and pulls the door handle to open a vehicle door. Where the prefabricated door handle is curved or contoured, the rear surface 3 along with the interior surface of the upper lip 4a and the lower lip 5a of the major elongate panel 1a can be similarly contoured to precisely conform to at least a portion of the visible surface of the door handle. Similarly, as illustrated in FIG. 6, the rear surface 3 of the minor elongate panel 1b is flush against the door handle, thereby reducing or eliminating any movement of the cover on the door handle when a user grips and pulls the door handle to open a vehicle door. Where the prefabricated door handle is curved or contoured, the rear surface 3 along with the interior surface of the upper lip 4b and the lower lip 5b of the minor elongate panel 1b can be contoured to precisely conform to at least a portion of the visible surface of the door handle.

In cases where the minor elongate panel 1b may not be comprised of an upper lip and a lower lip containing hook-shaped members, the minor elongate panel 1b will fit firmly and securely on the door handle by flushing against the door handle. In order to fix firmly against the door handle, these cases are flushed while requiring bonding material such as glue or double-sided tape, thereby reducing or eliminating any movement of the cover of the door handle when a user grips and pulls the door handle to open a vehicle door.

Still, referring to the third embodiment of the present invention, and as illustrated in FIGS. 6, 7 and 8, the cover is installed on a door handle by first manipulating the cover (e.g. bending or flexing it) so that the distance between the upper and lower longitudinal edges, 6a and 6b, of both the cover of the major elongate panel 1a and the minor elongate panel 1b are greater than the height of the door handle, allowing both edges to clear the door handle. Next, the cover comprising of the major elongate panel 1a and the minor elongate panel 1b is slid over the door handle and the pressure is relaxed. The relaxation will cause the cover to return to its natural rigid state, and grasp the door handle between the upper lip 4a and the lower lip 5a, and the upper lip 4b and the lower lip 5b of the major elongate panel 1a and the minor elongate panel 1b respectively. Alternatively, the cover may also be installed by placing the cover over the door handle so that one of the lips (i.e. either the upper lip 4a or the lower lip 5a of the major elongate panel 1a or either the upper lip 4b or the lower lip 5b of the minor elongate panel 1b) is aligned with a corresponding portion of the door handle, and subsequently manipulating the cover until an opposing lip engages with an opposing surface of the door handle.

Yet again, referring to the third embodiment of the present invention, and as illustrated in FIGS. 6, 7 and 8, it should noted that the disclosed snap-on door handle cover can be manufactured according to precise predetermined specifications (i.e. for a specific door handle of a particular make and model of vehicle) that can ensure the cover will sit firmly and securely on the door handle for which it is made without requiring bonding material, such as glue or double-sided tape. However, such bonding material may also be used, if desired, with the disclosed snap-on cover.

Figure 9:
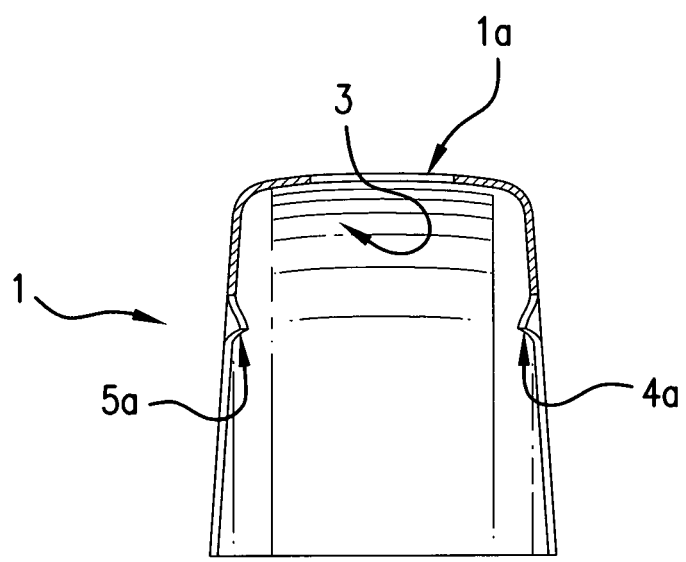
FIG. 9 illustrates a cross-sectional view of the vehicle door handle cover along an axis perpendicular to a longitudinal axis of the cover in accordance with a third embodiment of the presently disclosed subject matter.

Referring to the third embodiment of the present invention, and as illustrated in FIG. 9, the rear surface 3 of the major elongate panel 1a is shaped to precisely conform to a visible surface of a door handle such that upon engagement of the upper lip 4a and the lower lip 5a on the door handle, the rear surface 3 of the major elongate panel 1a is flush against the door handle, thereby reducing or eliminating any movement of the cover on the door handle when a user grips and pulls the door handle to open a vehicle door.

Figure 10:
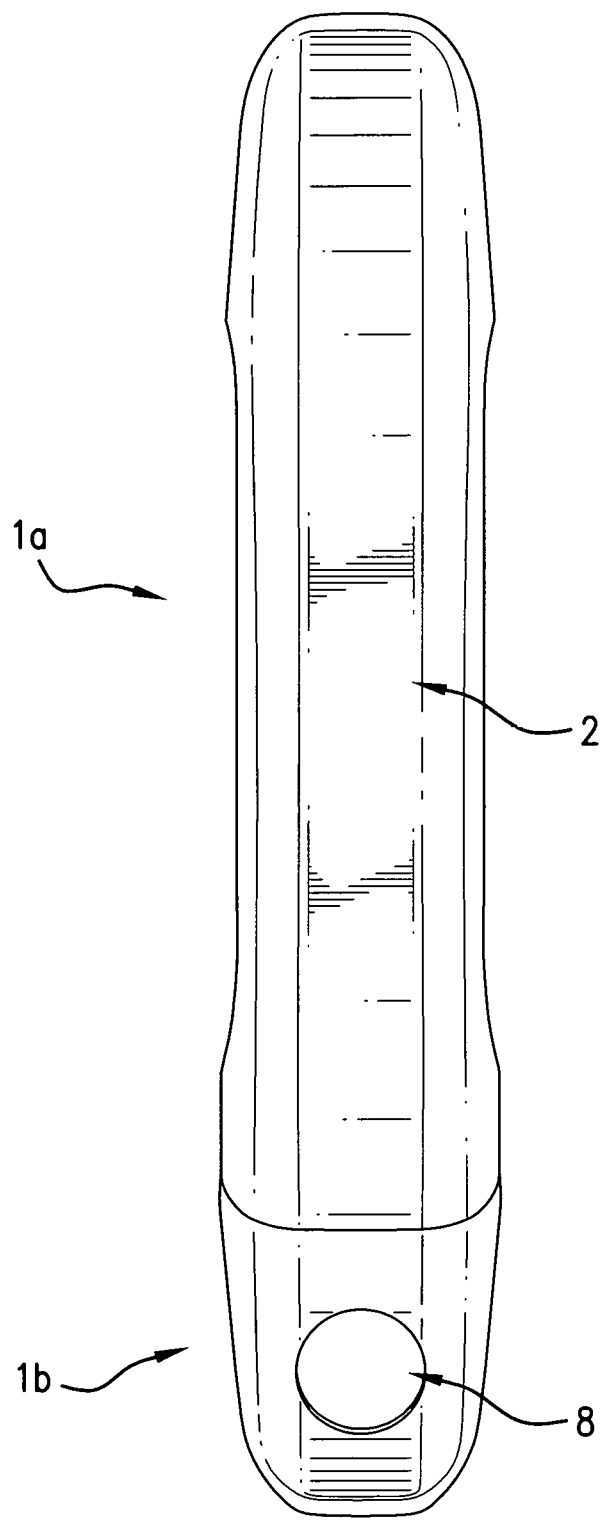
FIG. 10 illustrates a frontal view of the vehicle door handle cover in accordance with a fourth embodiment of the presently disclosed subject matter.
Figure 11:
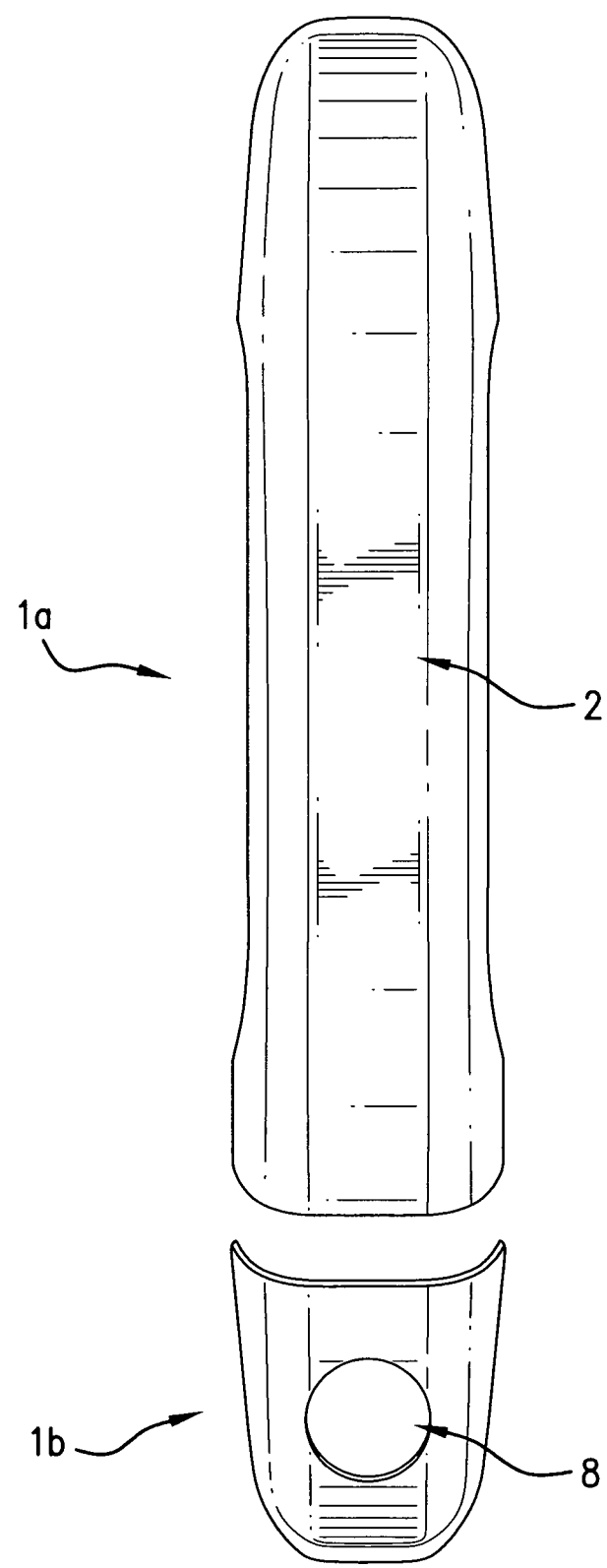
FIG. 11 illustrates a frontal view of the vehicle door handle cover in accordance with a fourth embodiment of the presently disclosed subject matter.
Figure 12:
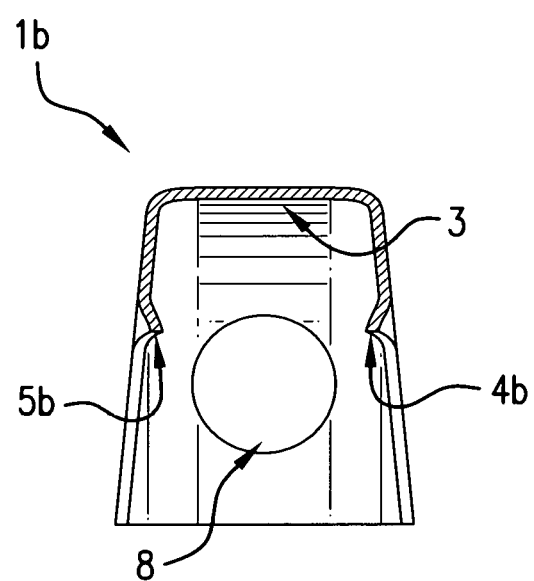
FIG. 12 illustrates a cross-sectional view of the vehicle door handle cover along an axis perpendicular to a longitudinal axis of the cover in accordance with a fourth embodiment of the presently disclosed subject matter.

Referring to the fourth embodiment of the present invention and as illustrated in FIG. 10, FIG. 11 and FIG. 12 are presented frontal views 2 of the door handle cover of the present invention. Specifically referring to FIG. 10, the major elongate panel 1a and the minor elongate panel 1b can be designed and/or installed to a vehicle door handle with no corresponding predetermined spacing and/or separation in mind, so as to grippingly engage a vehicle door handle with no corresponding predetermined spacing and/or separation; and, in addition, comprising an opening 8 formed in the rear surface 3 of the minor elongate panel 1b of the vehicle door handle cover of this present embodiment. Said opening can be of any shape or form for accommodating a mechanical and/or an electrical and/or a pneumatic means for interacting with a corresponding prefabricated locking means for locking and unlocking the door of a vehicle. Specifically referring to FIG. 11, the major elongate panel 1a and the minor elongate panel 1b can be designed and/or installed to a vehicle door handle with corresponding predetermined spacing and/or separation in mind, so as to grippingly engage a vehicle door handle with corresponding predetermined spacing and/or separation; and, in addition, comprising an opening 8 formed in the rear surface 3 of the minor elongate panel 1b of the vehicle door handle cover of this present embodiment. Said opening can be of any shape or form for accommodating a mechanical and/or an electrical and/or a pneumatic means for interacting with a corresponding prefabricated locking means for locking and unlocking the door of a vehicle.

Yet Still, referring to the fourth embodiment of the present invention, and as illustrated in FIG. 12, the rear surface 3 of the minor elongate panel 1b is shaped to precisely conform to a visible surface of a door handle such that upon engagement of the upper lip 4b and the lower lip 5b on the door handle, the rear surface of the minor elongate panel is flush against the door handle, thereby reducing or eliminating any movement of the cover on the door handle when a user grips and pulls the door handle to open a vehicle door.

Finally, as stated in the first and second embodiment of the present invention, preferably, the snap-on covers of the third and fourth embodiments are made of a rigid polymer material that can be temporarily flexed by applying force or pressure to the cover. However, it is not necessary for the cover to be made of a polymer; and suitable rigid material capable of being flexed would work.

It should be appreciated that the disclosed snap-on door handle cover can be manufactured according to precise predetermined specifications (i.e., for a specific door handle of a particular make and model of vehicle) that can ensure the cover will sit firmly and securely on the door handle for which it is made without requiring bonding material, such as glue or double-sided tape. However, such bonding material may also be used, if desired, with the disclosed snap-on cover.

That to produce the finished component parts of the four embodiments described in the specification, a three dimensional (3D) scanned imaging of the individual embodiment component parts are generated. Next, the three dimensional scanned imaging of said individual embodiment component parts are transferred to an injection molding computer to generate the injection molding designed precisely corresponding to each individual component parts of the three embodiments of the present invention. Next the desired material (preferably, but not limited to, rigid polymer material) is placed in the injection molding to form the individual component parts. After the individual component parts are formed from the injection molding, a fine tuning/finishing process ensues where the component parts are smoothed to remove all/any sharp and/or rough edges. Finally, the individual component parts of the present invention are chromed to obtain the final product.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A door handle cover comprising an elongate panel composed of a rigid polymer material having:
   a rigid polymer upper lip protruding continuously along a rigid polymer upper longitudinal edge and a rigid polymer upper arm edge which is curved with respect to the upper longitudinal edge;
   a rigid polymer lower lip protruding continuously along a rigid polymer lower longitudinal edge and a rigid polymer lower arm edge which is curved with respect to the lower longitudinal edge;
   an upper rigid polymer hook-shaped member that protrudes along the entire upper lip and defines an interior region which grippingly engages an upper portion of a door handle; and
   a lower rigid polymer hook-shaped member that protrudes along the entire lower lip and defines an interior region which grippingly engages a lower portion of the door handle;
   wherein upon engagement of said rigid polymer upper lip and said rigid polymer lower lip on the door handle the cover is thereby firmly affixed to the door handle.

2. The door handle cover of claim 1, wherein a rear surface of said elongate panel is contoured to precisely conform to at least a portion of said door handle such that upon engagement of said upper lip and said lower lip on said door handle, said elongate panel is flush against the door handle.

3. The door handle cover of claim 1, wherein said elongate panel is temporarily flexed during installation of said cover on said door handle.

4. The door handle cover of claim 1, wherein said elongate panel is temporarily flexed during installation on said door handle to firmly affix said upper lip and said lower lip to said upper portion and said lower portion of the door handle respectively.

5. The door handle cover of claim 1, wherein a front surface of said elongate panel is finished in a decorative finish.

6. The door handle cover of claim 1, wherein said cover is snapped on to said door handle and held firmly in place by means of said upper lip and said lower lip firmly affixing to the door handle.

7. A door handle cover comprising an elongate panel composed of a rigid polymer material having:
   an opening in a rear surface;
   a rigid polymer upper lip protruding continuously along a rigid polymer upper longitudinal edge and a rigid polymer upper arm edge which is curved with respect to the upper longitudinal edge;
   a rigid polymer lower lip protruding continuously along a rigid polymer lower longitudinal edge and a rigid polymer lower arm edge which is curved with respect to the lower longitudinal edge;
   an upper rigid polymer hook-shaped member that protrudes along the entire upper lip and defines an interior region which grippingly engages an upper portion of a door handle; and
   a lower rigid polymer hook-shaped member that protrudes along the entire lower lip and defines an interior region which grippingly engages a lower portion of the door handle;
   wherein upon engagement of said rigid polymer upper lip and said rigid polymer lower lip on said door handle the cover is thereby firmly affixed to said door handle.

8. The door handle cover of claim 7, wherein a mechanical means for interacting with a preinstalled locking means for locking and unlocking a door of a vehicle is installed in said opening.

9. The door handle cover of claim 7, wherein an electrical means for interacting with a preinstalled locking means for locking and unlocking a door of a vehicle is installed in said opening.

10. The door handle cover of claim 7, wherein a pneumatic means for interacting with a preinstalled locking means for locking and unlocking a door of a vehicle is installed in said opening.

11. The door handle cover of claim 7, wherein the rear surface of said elongate panel is contoured to precisely conform to at least a portion of said door handle such that upon engagement of said upper lip and said lower lip on said door handle, said elongate panel is flush against the door handle.

12. The door handle cover of claim 7, wherein said elongate panel is temporarily flexed during installation of said cover on the door handle.

13. The door handle cover of claim 7, wherein said elongate panel is temporarily flexed during installation on said door handle to firmly affix said upper lip and said lower lip to said upper portion and said lower portion of the door handle respectively.

14. The door handle cover of claim 7, wherein a front surface of said elongate panel is finished in a decorative finish, and said cover is snapped on to said door handle and held firmly in place by means of said upper lip and said lower lip and by affixing to the door handle.

15. A door handle cover comprising:
   a major elongate panel composed of a rigid polymer material;
   a minor elongate panel composed of a rigid polymer material and having an opening;
   the major elongate panel having:
      a rigid polymer upper lip protruding continuously along a rigid polymer upper longitudinal edge and a rigid polymer upper arm edge which is curved with respect to the upper longitudinal edge;
      a rigid polymer lower lip protruding continuously along a rigid polymer lower longitudinal edge and a rigid polymer lower arm edge which is curved with respect to the lower longitudinal edge;
      an upper rigid polymer hook-shaped member that protrudes along the entire upper lip and defines an interior region which grippingly engages an upper portion of a door handle; and
      a lower rigid polymer hook-shaped member that protrudes along the entire lower lip and defines an interior region which grippingly engages a lower portion of the door handle;
   wherein upon engagement of said upper lip and said lower lip on said door handle the major elongate panel is thereby firmly affixed to said door handle.

16. The door handle cover of claim 15, wherein a mechanical means for interacting with a preinstalled locking means for locking and unlocking a door of a vehicle is installed in said opening.

17. The door handle cover of claim 15, wherein an electrical means for interacting with a preinstalled locking means for locking and unlocking a door of a vehicle is installed in said opening.

18. The door handle cover of claim 15, wherein a pneumatic means for interacting with a preinstalled locking means for locking and unlocking a door of a vehicle is installed in said opening.

19. The door handle cover of claim 15, wherein said major elongate panel and said minor elongate panel are installed with no spacing, so that when mounted to the door handle the door handle cover comprising of said major elongate panel and said minor elongate panel appears as a single unit.

20. The door handle cover of claim 15, wherein said major elongate panel and said minor elongate panel are installed as separate entities, so that when mounted to the door handle the door handle cover comprising of said major elongate panel and said minor elongate panel appears as two units.

21. The door handle cover of claim 15, wherein rear surfaces of said major and minor elongate panels are contoured to precisely conform to at least a portion of said door handle such that upon engagement of said upper lip and said lower lip on said door handle, said elongate panels are flush against the door handle.

22. The door handle cover of claim 15, wherein said major and minor elongate panels are temporarily flexed during installation of said cover on said door handle.

23. The door handle cover of claim 15, wherein said major and minor elongate panels are temporarily flexed during installation on said door handle to affix said upper lip and said lower lip to said upper portion and said lower portion of the door handle respectively.

24. The door handle cover of claim 15, wherein front surfaces of the elongate panels are finished in a decorative finish, and said major elongate panel is snapped on to said door handle and held firmly in place by means of said upper lip and said lower lip engaging the door handle.

25. A door handle cover comprising:
a major elongate panel composed of a rigid polymer material;
a minor elongate panel composed of a rigid polymer material and having an opening;
the major elongate panel having:
a rigid polymer upper lip protruding continuously along a rigid polymer upper longitudinal edge and a rigid polymer upper arm edge which is curved with respect to the upper longitudinal edge;
a rigid polymer lower lip protruding continuously along a rigid polymer lower longitudinal edge and a rigid polymer lower arm edge which is curved with respect to the lower longitudinal edge;
an upper rigid polymer hook-shaped member that protrudes along the entire upper lip and defines an interior region which grippingly engages an upper portion of a door handle; and
a lower rigid polymer hook-shaped member that protrudes along the entire lower lip and defines an interior region which grippingly engages a lower portion of the door handle;
wherein upon engagement of said upper lip and said lower lip on said door handle, the major elongate panel is thereby firmly affixed to said door handle; and
said door handle cover is manufactured by a process comprising the steps of:
a) providing a three dimensional scanned imaging of individual component parts;
b) transferring said three dimensional scanned imaging of said individual component parts to an injection molding computer to generate precise corresponding design of said component parts;
c) placing rigid polymer material in an injection molding to form said individual component parts;
d) finishing said component parts by smoothing said parts and removing all sharp and rough edges; and
e) chroming said component parts.

26. The door handle cover of claim 25, wherein said major elongate panel and said minor elongate panel are installed with no spacing, so that when mounted to the door handle the door handle cover comprising of said major elongate panel and said minor elongate panel appears as a single unit.

27. The door handle cover of claim 25, wherein said major elongate panel and said minor elongate panel are installed as separate entities, so that when mounted to the door handle, the door handle cover comprising of said major elongate panel and said minor elongate panel appears as two units.

* * * * *

UNITED STATES PATENT AND TRADEMARK OFFICE
CERTIFICATE OF CORRECTION

PATENT NO. : 10,787,839 B2
APPLICATION NO. : 16/602320
DATED : September 29, 2020
INVENTOR(S) : Fattouche It is certified that error appears in the above-identified patent and that said Letters Patent is hereby corrected as shown below:

In the Specification

In Column 2, Line 19, "flush" should be changed to -- flushed --

In Column 2, Line 40, "and said upper lip" should be changed to -- said upper lip --

In Column 3, Line 43, "comprise" should be changed to -- comprising --

In Column 3, Line 57, "finished in a [0038] decorative finish" should be changed to -- finished in a decorative finish --

In Column 3, Line 67, "flush" should be changed to -- flushed --

In Column 4, Line 24, "on" should be changed to -- or --

In Column 4, Line 33, "comprise" should be changed to -- comprised --

In Column 4, Line 41, "exist" should be changed to -- exists --

In Column 4, Line 67, "flush" should be changed to -- flushed --

In Column 5, Line 44, "comprise" should be changed to -- comprised --

In Column 5, Line 57, "comprise" should be changed to -- comprised --

In Column 5, Line 59, "comprise" should be changed to -- comprised --

In Column 6, Line 49, "flush" should be changed to -- flushed --

In Column 6, Line 59, "flush" should be changed to -- flushed --

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 10,787,839 B2

In Column 7, Line 49, "flush" should be changed to -- flushed --

In Column 8, Line 21, "flush" should be changed to -- flushed --

In Column 8, Line 48, "parts" should be changed to -- part --

In Column 9, Line 36, "flush" should be changed to -- flushed --

In Column 10, Line 24, "flush" should be changed to -- flushed --

In the Claims

In Column 11, Line 23, "flush" should be changed to -- flushed --